United States Patent
Al-Shammari et al.

(10) Patent No.: US 10,227,534 B2
(45) Date of Patent: Mar. 12, 2019

(54) MULTI STAGE FISCHER-TROPSCH REACTOR AND METHODS OF PRODUCING HYDROCARBONS

(71) Applicant: SABIC GLOBAL TECHNOLOGIES B.V., Bergen op Zoom (NL)

(72) Inventors: Talal Khaled Al-Shammari, Riyadh (SA); Khalid Karim, Riyadh (SA)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/525,159

(22) PCT Filed: Nov. 12, 2015

(86) PCT No.: PCT/IB2015/058751
§ 371 (c)(1),
(2) Date: May 8, 2017

(87) PCT Pub. No.: WO2016/075653
PCT Pub. Date: May 19, 2016

(65) Prior Publication Data
US 2017/0335203 A1    Nov. 23, 2017

Related U.S. Application Data

(60) Provisional application No. 62/079,654, filed on Nov. 14, 2014.

(51) Int. Cl.
*B01J 8/04* (2006.01)
*C10G 2/00* (2006.01)

(52) U.S. Cl.
CPC .............. *C10G 2/341* (2013.01); *B01J 8/048* (2013.01); *B01J 8/0453* (2013.01); *B01J 8/0496* (2013.01); *C10G 2/32* (2013.01); *B01J 2208/023* (2013.01)

(58) Field of Classification Search
CPC .................................. C10G 2/34; C10G 2/341
See application file for complete search history.

(56) References Cited

U.S. PATENT DOCUMENTS 2,602,811 A * 7/1952 Montgomery .......... C07C 1/047
518/706
4,199,523 A * 4/1980 Rottig ..................... C07C 1/041
518/706

(Continued)

FOREIGN PATENT DOCUMENTS

| AU | 2009213077 | 10/2009 |
| EP | 2450420 | 5/2012 |
| WO | WO 2013/038140 | 3/2013 |

OTHER PUBLICATIONS

International Search Report and Written Opinion dated Mar. 11, 2016 by the International Searching Authority for International Application No. PCT/IB2015/058751, which was filed on Nov. 14, 2014 and published as WO/2016/075653 on May 19, 2016 (Applicant—Sabic Global Technologies B.V.; Inventor—Talal Khaled Al-Shammari et al.) (8 pages).

(Continued)

Primary Examiner — Jennifer A Leung
(74) Attorney, Agent, or Firm — Ballard Spahr LLP

(57) ABSTRACT

Disclosed herein are reactors comprising: a) a first mixing zone, b) a first reaction zone, c) a first cooling zone, d) a first $H_2O$ separation zone, e) a second mixing zone, f) a second reaction zone, g) a second cooling zone, and h) a second $H_2O$ separation zone, wherein the first mixing zone is in fluid communication with the first reaction zone, wherein the first reaction zone is in fluid communication with the first cooling zone, wherein the first cooling zone is in fluid communication with the first $H_2O$ separation zone, wherein the first $H_2O$ separation zone is in fluid communication with the second mixing zone, wherein the second mixing zone is (Continued)

in fluid communication with the second reaction zone, wherein the second reaction zone is in fluid communication with the second cooling zone, and wherein the second cooling zone is in fluid communication with the second $H_2O$ separation zone.

20 Claims, 3 Drawing Sheets

(56) References Cited

U.S. PATENT DOCUMENTS

| | | |
|---|---|---|
| 6,156,809 A | 12/2000 | Clark et al. |
| 7,683,099 B2 * | 3/2010 | Hipp ................... B01J 8/0496 |
| | | 423/359 |
| 8,034,308 B2 | 10/2011 | Chiu et al. |
| 8,557,880 B2 | 10/2013 | Schellen et al. |
| 2004/0102530 A1 | 5/2004 | Borsa et al. |
| 2010/0324157 A1 | 12/2010 | Bauman et al. |

OTHER PUBLICATIONS

Eigenberger, G. et al., "Catalytic Fixed-Bed Reactors", Ullmann's Encyclopedia of Industrial Chemistry, Published Online: (2012), p. 17.

Rohde, M.P., "In-situ H2O removal via hydrophilic membranes during Fischer-Tropsch and other fuel-related synthesis reactions," (2010) p. 29 (Dissertation).

* cited by examiner

MULTI STAGE FISCHER-TROPSCH REACTOR AND METHODS OF PRODUCING HYDROCARBONS

CROSS-REFERENCE TO RELATED APPLICATION

This is a U.S. National Phase Application of International Application No. PCT/IB2015/058751, filed Nov. 12, 2015, which claims the benefit of U.S. Provisional Application No. 62/079,654, filed on Nov. 14, 2014, which are both incorporated herein by reference in their entirety.

BACKGROUND

Syngas (mixtures of hydrogen ($H_2$)) and carbon monoxide (CO)) can be readily produced from either coal or methane (natural gas) by methods well known in the art and widely commercially practiced around the world. A number of well-known industrial processes use syngas for producing various oxygenated organic chemicals. The Fischer-Tropsch catalytic process for catalytically producing hydrocarbons from syngas was initially discovered and developed in the 1920's, and was used in South Africa for many years to produce gasoline range hydrocarbons as automotive fuels. Reactors and methods that efficiently carry out the Fischer-Tropsch catalytic process are desired.

Accordingly, reactors and methods that efficiently carry out the Fischer-Tropsch catalytic process are disclosed herein.

SUMMARY OF THE INVENTION

Disclosed herein is a reactor comprising: a) a first mixing zone, b) a first reaction zone, c) a first cooling zone, d) a first $H_2O$ separation zone, e) a second mixing zone, f) a second reaction zone, g) a second cooling zone, and h) a second $H_2O$ separation zone, wherein the first mixing zone is in fluid communication with the first reaction zone, wherein the first reaction zone is in fluid communication with the first cooling zone, wherein the first cooling zone is in fluid communication with the first $H_2O$ separation zone, wherein the first $H_2O$ separation zone is in fluid communication with the second mixing zone, wherein the second mixing zone is in fluid communication with the second reaction zone, wherein the second reaction zone is in fluid communication with the second cooling zone, and wherein the second cooling zone is in fluid communication with the second $H_2O$ separation zone.

Disclosed herein is a method of producing hydrocarbons comprising: a) providing a reactor disclosed herein; b) introducing syngas in the first mixing zone; c) catalytically reacting at least a portion of the syngas in the first reaction zone, thereby producing a first product comprising hydrocarbons, $H_2O$, and unreacted syngas; d) cooling the first product in the first cooling zone; e) removing at least a portion of the $H_2O$ from the first product in the first $H_2O$ separation zone; f) introducing the first product in the second mixing zone; g) catalytically reacting at least a portion of the unreacted syngas in the first product in the second reaction zone, thereby producing a second product comprising hydrocarbons, $H_2O$, and unreacted syngas; h) cooling the second product in the second cooling zone; and i) removing at least a portion of the $H_2O$ from the second product in the second $H_2O$ separation zone.

Additional advantages will be set forth in part in the description which follows, and in part will be obvious from the description, or can be learned by practice of the aspects described below. The advantages described below will be realized and attained by means of the chemical compositions, methods, and combinations thereof particularly pointed out in the appended claims. It is to be understood that both the foregoing general description and the following detailed description are exemplary and explanatory only and are not restrictive.

DESCRIPTION OF THE FIGURES

The accompanying figures, which are incorporated in and constitute a part of this specification, illustrate several aspects and together with the description serve to explain the principles of the invention.

Figure 1:
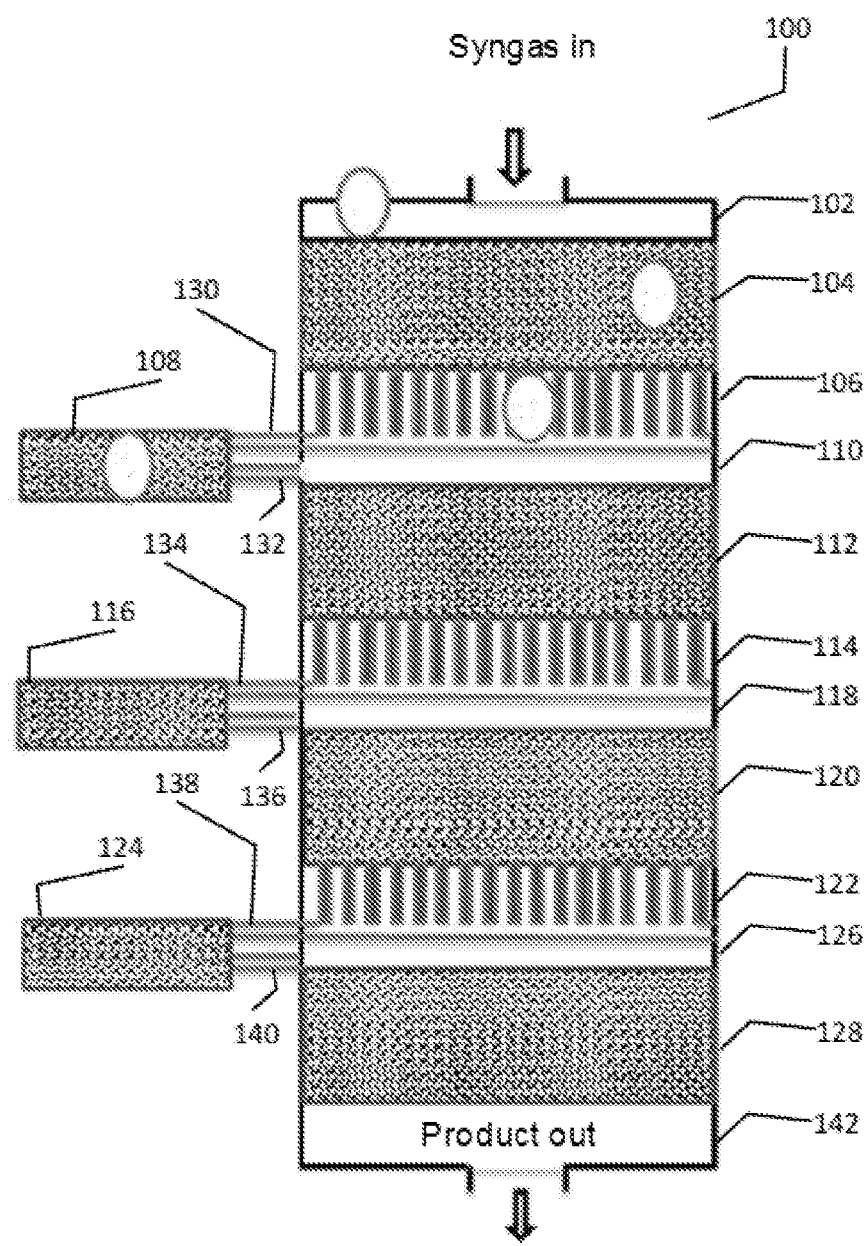
FIG. 1 shows an exemplary design of the reactors disclosed herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Disclosed herein are materials, compounds, compositions, and components that can be used for, can be used in conjunction with, can be used in preparation for, or are products of the disclosed method and compositions. It is to be understood that when combinations, subsets, interactions, groups, etc. of these materials are disclosed that while specific reference of each various individual and collective combinations and permutation of these compounds cannot be explicitly disclosed, each is specifically contemplated and described herein. For example, if a catalyst component is disclosed and discussed, and a number of alternative solid state forms of that component are discussed, each and every combination and permutation of the catalyst component and the solid state forms that are possible are specifically contemplated unless specifically indicated to the contrary. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

1. Definitions

In this specification and in the claims which follow, reference will be made to a number of terms which shall be defined to have the following meanings:

It must be noted that, as used in the specification and the appended claims, the singular forms "a," "an" and "the" include plural referents unless the context clearly dictates otherwise. Thus, for example, reference to "a catalyst" includes mixtures of catalysts.

Ranges can be expressed herein as from "one particular value, and/or to" another particular value. When such a range is expressed, another aspect includes from the one particular value and/or to the other particular value. Similarly, when values are expressed as approximations, by use of the antecedent "," it will be understood that the particular value forms another aspect. It will be further understood that the endpoints of each of the ranges are significant both in relation to the other endpoint, and independently of the other endpoint.

References in the specification and claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight of component Y, X and Y are present at a weight ratio of 2:5, and are present in such a ratio regardless of whether additional components are contained in the compound.

A weight percent of a component, unless specifically stated to the contrary, is based on the total weight of the formulation or composition in which the component is included.

As used herein, the terms space time yield ("STY") refers to the tons or kg of product that is produced per unit time, per volume of catalyst.

2. Reactor

The Fischer-Tropsch catalytic process for producing hydrocarbons from syngas is known in the art. Several reactions can take place in a Fischer-Tropsch process, such as, a Fischer-Tropsch (FT) reaction, a water gas shift reaction, and a hydrogen methanation, as shown in Scheme 1.

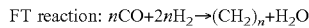
FT reaction: $nCO + 2nH_2 \rightarrow (CH_2)_n + H_2O$

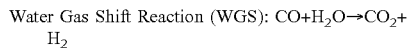
Water Gas Shift Reaction (WGS): $CO + H_2O \rightarrow CO_2 + H_2$

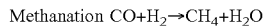
Methanation $CO + H_2 \rightarrow CH_4 + H_2O$     Scheme 1

The production of $CO_2$, $CH_4$, and heavy hydrocarbon (C10+) is unwanted in Fischer-Tropsch processes, which targets the production of light hydrocarbons (C2-C5). $CO_2$ and $H_2O$ can negatively affect the performance (i.e. activity and selectivity) of the catalyst used in Fischer-Tropsch processes. The reactors and methods disclosed herein minimize the unwanted reaction in the Fischer-Tropsch process by cooling the product mixture and by removing water ($H_2O$) in a series of steps, thereby promoting catalyst activity and the production of light hydrocarbons.

The reactor disclosed herein allows the syngas to be catalytically reacted with a catalyst suitable for carrying out a Fischer-Tropsch reaction. Unwanted $H_2O$, as liquid and/or steam, is removed prior to each catalytic process, thereby increasing the total conversion rate of the syngas into desired hydrocarbon products, such as light hydrocarbons.

Disclosed herein is a reactor comprising: a) a first mixing zone, b) a first reaction zone, c) a first cooling zone, d) a first $H_2O$ separation zone, e) a second mixing zone, f) a second reaction zone, g) a second cooling zone, and h) a second $H_2O$ separation zone, wherein the first mixing zone is in fluid communication with the first reaction zone, wherein the first reaction zone is in fluid communication with the first cooling zone, wherein the first cooling zone is in fluid communication with the first $H_2O$ separation zone, wherein the first $H_2O$ separation zone is in fluid communication with the second mixing zone, wherein the second mixing zone is in fluid communication with the second reaction zone, wherein the second reaction zone is in fluid communication with the second cooling zone, and wherein the second cooling zone is in fluid communication with the second $H_2O$ separation zone.

In one aspect, the reactor further comprises: i) a third mixing zone, j) a third reaction zone, k) a third cooling zone, and l) a third $H_2O$ separation zone, wherein the second $H_2O$ separation zone is in fluid communication with the third mixing zone, wherein the third mixing zone is in fluid communication with the third reaction zone, wherein the third reaction zone is in fluid communication with the third cooling zone, and wherein the third cooling zone is in fluid communication with the third $H_2O$ separation zone.

In one aspect, the reactor further comprises: m) a fourth mixing zone, n) a fourth reaction zone, o) a fourth cooling zone, and p) a fourth $H_2O$ separation zone, wherein the third $H_2O$ separation zone is in fluid communication with the fourth mixing zone, wherein the fourth mixing zone is in fluid communication with the fourth reaction zone, wherein the fourth reaction zone is in fluid communication with the fourth cooling zone, and wherein the fourth cooling zone is in fluid communication with the fourth $H_2O$ separation zone.

In one aspect, the mixing zone, reaction zone, and cooling zone have a common longitudinal axis, while the $H_2O$ separation zone does not have a common longitudinal axis with the mixing zones, reaction zones, and cooling zones.

In one aspect, the reaction zone can comprise a catalyst holding zone. In one aspect, the reaction zone can comprise a first one or more catalyst holding zones, wherein each of the first one or more catalyst holding zones have a first inner surface, wherein the first inner surface defines a first interior space, wherein each of the first one or more catalyst holding zones have a first longitudinal axis, wherein each of the first one or more catalyst holding zones have a first end and a second end, wherein the first inner surface is tapered towards the first longitudinal axis from the first end towards the second end, and wherein each of the first one or more catalyst holding zone are configured to perform a Fischer-Tropsch reaction.

In another aspect, the reaction zone can further comprise a second one or more catalyst holding zones, wherein each of the second one or more catalyst holding zone have a second inner surface, wherein the second inner surface defines a second interior space, wherein each of the second one or more catalyst holding zones have a second longitudinal axis, wherein each of the second one or more catalyst holding zones have a first end and a second end, wherein the second inner surface is tapered away from the first longitudinal axis from the first end towards the second end, and wherein each of the second one or more catalyst holding zones are configured to perform a Fischer-Tropsch reaction.

In yet another aspect, the reaction zone can comprise a first one or more catalyst holding zone and a second one or more holding zones, wherein each of the first one or more catalyst holding zones have a first inner surface, wherein the first inner surface defines a first interior space, wherein each of the first one or more catalyst holding zone have a first longitudinal axis, wherein each of the first one or more catalyst holding zones have a first end and a second end, wherein the first inner surface is tapered towards the first longitudinal axis from the first end towards the second end, wherein each of the second one or more catalyst holding zones have a second inner surface, wherein the second inner surface defines a second interior space, wherein each of the second one or more catalyst holding zones have a second longitudinal axis, wherein each of the second one or more catalyst holding zones have a first end and a second end, wherein the second inner surface is tapered away from the first longitudinal axis from the first end towards the second end, and wherein each of the first one or more catalyst holding zones and the second one or more catalyst holding zones are configured to perform a Fischer-Tropsch reaction.

In one aspect, the first cooling zone is in fluid communication with the first $H_2O$ separation zone via a first connector. In one aspect, the first $H_2O$ separation zone is in fluid communication with the second mixing zone via a second connector. In one aspect, the second cooling zone is in fluid communication with the second $H_2O$ separation zone via a third connector. In one aspect, the second $H_2O$ separation zone is in fluid communication with the third mixing zone via a fourth connector. In one aspect, the third cooling zone is in fluid communication with the third $H_2O$ separation zone via a fifth connector. In one aspect, the third $H_2O$ separation zone is in fluid communication with the fourth mixing zone via a sixth connector. In one aspect, the fourth cooling zone is in fluid communication with the fourth $H_2O$ separation zone via a seventh connector. The connectors can be tubes configured to transport the products to and from the $H_2O$ separation zone.

It is appreciated that the reactor can comprise additional zones such as a fifth, sixth, seventh, eighth, ninth, tenth, eleventh, twelfth, thirteenth, fourteenth, fifteenth, sixteenth, seventeenth, eighteenth, nineteenth, and twentieth zone. It is understood that the zones, such as, for example, the fifth zone would include a mixing, reaction, cooling and $H_2O$ separation zone as described herein.

The mixing zone, such as, for example, the first mixing zone, the second mixing zone, the third mixing zone, and/or the fourth mixing zone can be configured to allow mixing of gases. For example, the first mixing zone can be configured to allow mixing of gases. In another example, the second mixing zone can be configured to allow mixing of gases. In yet another example, the third mixing zone can be configured to allow mixing of gases. In yet another example, the fourth mixing zone can be configured to allow mixing of gases. For example, the mixing zone can comprise of free space that allow for mixing of gases.

The gases that are being mixed in the mixing zones described herein can comprise $H_2$ and CO. The $H_2$/CO molar ratio of the feed gas to the first mixing zone can be from 0.5 to 4. For example, the $H_2$/CO molar ratio can be from 1.0 to 3.0, such as, for example, from 1.5 to 3.0, or in another example, from 1.5 to 2.5. It will be appreciated that the $H_2$/CO molar ratio can control the selectivity of the hydrocarbons that are being produced. For example, a lower molar ratio can result in higher $C_5$+ selectivity (at specific conditions). The consumption molar ratio is usually from about 1.0 to about 2.5, such as for example, from about 1.5 to 2.1, this ratio increases as long as the water gas shift reaction is active and, thus, the use of a feed ratio below the consumption ratio will result in a stable $H_2$/CO ratio during the reaction within an acceptable range (normally below 2).

The $H_2$ and CO are catalytically reacted in a Fischer-Tropsch reaction in the reaction zones described herein. Thus, the reaction zone, such as the first reaction zone, the second reaction zone, the third reaction zone, and/or the fourth reaction zone can comprise one or more Fischer-Tropsch catalysts. For example, the first reaction zone can comprise one or more Fischer-Tropsch catalysts. In another example, the second reaction zone can comprise one or more Fischer-Tropsch catalysts. In yet another example, the third reaction zone can comprise one or more Fischer-Tropsch catalysts. In yet another example, the fourth reaction zone can comprise one or more Fischer-Tropsch catalysts. Fischer-Tropsch catalysts are known in the art and can, for example, be Fe based catalysts and/or Co based catalysts and/or Ru based catalysts. Such catalysts are described in U.S. Pat. No. 4,088,671 and U.S. Pat. No. 4,207,248, which are incorporated herein by their entirety, specifically for their disclosure regarding Fisher-Tropsh catalysts.

In one aspect, the amount of catalyst can be the same in each reaction zone. In another aspect, the amount of catalyst can vary in each reaction zone. For example, some $H_2$ and CO are converted into products in each reaction zone, therefore, reducing the amount of $H_2$ and CO in the subsequent reaction zone. Less catalyst could be needed in each subsequent reaction zone because less $H_2$ and CO are present to be converted into product. For example, the amount of catalyst in the second reaction zone can be less than the amount of catalyst in the first reaction zone. In another example, the amount of catalyst in the third reaction zone is less than the amount of catalyst in the second reaction zone. In yet another example, the amount of catalyst in the fourth reaction zone is less than the amount of catalyst in the third reaction zone. In yet another example, the amount of catalyst in the third reaction zone is less than the amount of catalyst in the first reaction zone. In yet another example, the amount of catalyst in the fourth reaction zone is less than the amount of catalyst in the first reaction zone.

The CO conversion per reaction zone can be from 2 to 50 vol %, such as, for example, from 3 to 40 vol %, or from 6 to 15 vol % (conversion of CO is based on feed stream to that particular reaction zone). It will be appreciated that the conversion per reaction can vary as CO is consumed at each prior reaction zone.

The Fischer-Tropsch reaction that is carried out in the reaction zone produces heat. The cooling zones described herein, such as, for example, the first cooling zone, the second cooling zone, the third cooling zone, and/or the fourth cooling zone are configured to absorb and remove some of the heat generated in the reaction zones. For example, the first cooling zone can be configured to absorb and remove heat. In another example, the second cooling zone can be configured to absorb and remove heat. In yet another example, the third cooling zone can be configured to absorb and remove heat. In yet another example, the fourth cooling zone can be configured to absorb and remove heat.

The cooling zones described herein can comprise a system, such as an intercooler system, that is capable of absorbing and removing heat. For example, the first cooling zone can comprise an intercooler system. In another example, the second cooling zone can comprise an intercooler system. In yet another example, the third cooling zone can comprise an intercooler system. In yet another example, the fourth cooling zone can comprise an intercooler system. The intercooler system can absorb and remove at least 30%, 50%, 70% or 90% of the heat generated by the Fischer-Tropsch reaction.

The $H_2O$ separation zone described herein, such as, for example, the first $H_2O$ separation zone, second $H_2O$ separation zone, third $H_2O$ separation zone and/or fourth $H_2O$ separation zone can comprise an $H_2O$ absorbent material. In one aspect, the first $H_2O$ separation zone can comprise an $H_2O$ absorbent material. In one aspect, the second $H_2O$ separation zone can comprise an $H_2O$ absorbent material. In one aspect, the third $H_2O$ separation zone can comprise an $H_2O$ absorbent material. In one aspect, the fourth $H_2O$ separation zone can comprise an $H_2O$ absorbent material.

The $H_2O$ absorbent material can be, for example, membranes or reactive absorbents. Non-limiting examples of a $H_2O$ absorbent material include superabsorbent polymers. Superabsorbent polymers are known in by one skilled in the art.

The $H_2O$ separation zone described herein, such as, for example, the first $H_2O$ separation zone, second $H_2O$ separation zone, third $H_2O$ separation zone and/or fourth $H_2O$ separation zone can comprise a mechanical barrier, such as a membrane, to separate $H_2O$. In one aspect, the first $H_2O$ separation zone can comprise mechanical barrier, such as a membrane, to separate $H_2O$. In one aspect, the second $H_2O$ separation zone can comprise a mechanical barrier, such as a membrane, to separate $H_2O$. In one aspect, the third $H_2O$ separation zone can comprise a mechanical barrier, such as a membrane, to separate $H_2O$. In one aspect, the fourth $H_2O$ separation zone can comprise a mechanical barrier, such as a membrane, to separate $H_2O$.

In one aspect, the $H_2O$ separation zone described herein, such as, for example, the first $H_2O$ separation zone, second $H_2O$ separation zone, third $H_2O$ separation zone and/or fourth $H_2O$ separation zone can comprise a mechanical barrier, such as a membrane, to separate $H_2O$ and a $H_2O$ absorbent material.

Non-limiting examples of a mechanical barrier is a membrane made from a resin or superabsorbent polymers.

In one aspect, the reactor comprises a divider, such as a metal plate or sheet, between first, second, third or fourth zones. Thus, for example, a divider can be present between the first cooling zone and the second mixing zone.

As described herein, the different zones, such as the mixing zones, reaction zones, cooling zones, and $H_2O$ separation zones, are physically distinguishable and can, in some aspects, be separated by a physical barrier.

In one aspect, the reactor is an industrial size reactor. For example, the reactor can have a volume of at least 1,000 liters, 2,000 liters, 5,000 liters, or 10,000 liters. For example, the reactor can have a volume 1,000 liter to 10,000 liter.

Now referring to FIG. 1, which shows a non-limiting exemplary aspect of the reactors disclosed herein. FIG. 1 shows reactor (100) with a first mixing zone (102), which comprises free space to allow for gas mixing. The first mixing zone (102) is in fluid communication with a first reaction zone (104), which can comprise a catalyst suitable to carry out a Fischer-Tropsch reaction. The first reaction zone (104) is in fluid communication with a first cooling zone (106), which can comprise a cooling system, such as, for example, an intercooler. The first cooling zone (106) is in fluid communication with a first $H_2O$ separation zone (108), which can comprise an $H_2O$ absorbent material and/or a mechanical barrier, such as a membrane, to separate $H_2O$. The first cooling zone (106) can be in fluid communication with the first $H_2O$ separation zone (108) via a first connector (130). The first $H_2O$ separation zone (108) is in fluid communication with a second mixing zone (110), which comprises free space to allow for gas mixing. The first $H_2O$ separation zone (108) can be in fluid communication with a second mixing zone (110) via a second connector (132). The second mixing zone (110) is in fluid communication with a second reaction zone (112), which can comprise a catalyst suitable to carry out a Fischer-Tropsch reaction. The second reaction zone (112) is in fluid communication with a second cooling zone (114), which can comprise a cooling system, such as, for example, an intercooler. The second cooling zone (114) is in fluid communication with a second $H_2O$ separation zone (116), which can comprise an $H_2O$ absorbent material. The second cooling zone (114) can be in fluid communication with the second $H_2O$ separation zone (116) via a third connector (134). The second $H_2O$ separation zone (116) is in fluid communication with a third mixing zone (118), which comprises free space to allow for gas mixing. The second $H_2O$ separation zone (116) can be in fluid communication with a third mixing zone (118) via a fourth connector (136). The third mixing zone (118) is in fluid communication with a third reaction zone (120), which can comprise a catalyst suitable to carry out a Fischer-Tropsch reaction. The third reaction zone (120) is in fluid communication with a third cooling zone (122), which can comprise a cooling system, such as, for example, an intercooler. The third cooling zone (122) is in fluid communication with a third $H_2O$ separation zone (124), which can comprise an $H_2O$ absorbent material. The third cooling zone (122) can be in fluid communication with the third $H_2O$ separation zone (124) via a fifth connector (138). The third $H_2O$ separation zone (124) is in fluid communication with a fourth mixing zone (126), which comprises free space to allow for gas mixing. The third $H_2O$ separation zone (124) can be in fluid communication with the fourth mixing zone (126) via a sixth connector (140). The fourth mixing zone (126) is in fluid communication with a fourth reaction zone (128), which can comprise a catalyst suitable to carry out a Fischer-Tropsch reaction. The fourth reaction zone (128) is in fluid communication with a product collection zone (142).

Figure 2:
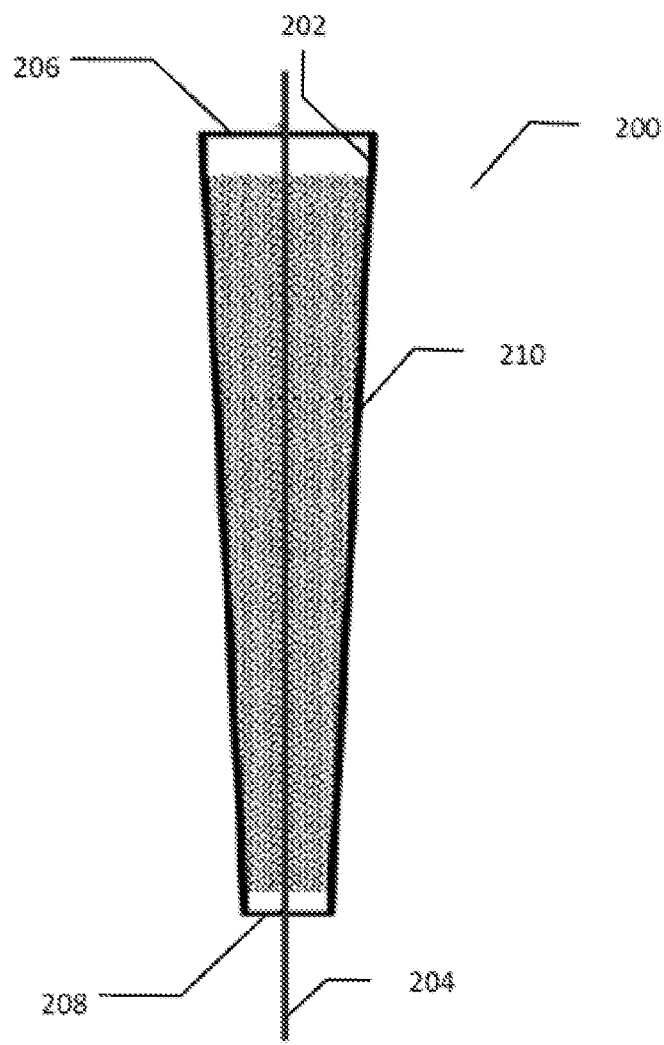
FIG. 2 shows a non-limiting view of a first catalyst holding zone.

Now referring to FIG. 2, which shows a non-limiting exemplary aspect of the reactors disclosed herein. FIG. 2 shows first catalyst holding zone (200) with a first inner surface (102). The first catalyst holding zone (200) also have a first longitudinal axis (204). The inner surface (202) is tapered toward the first longitudinal axis (104) from the first end (206) to the second end (208). The first catalyst holding zone (200) can also have a first outer surface (210), the first outer surface (210) can be inner surface of a second catalyst holding zone described herein.

Figure 3:
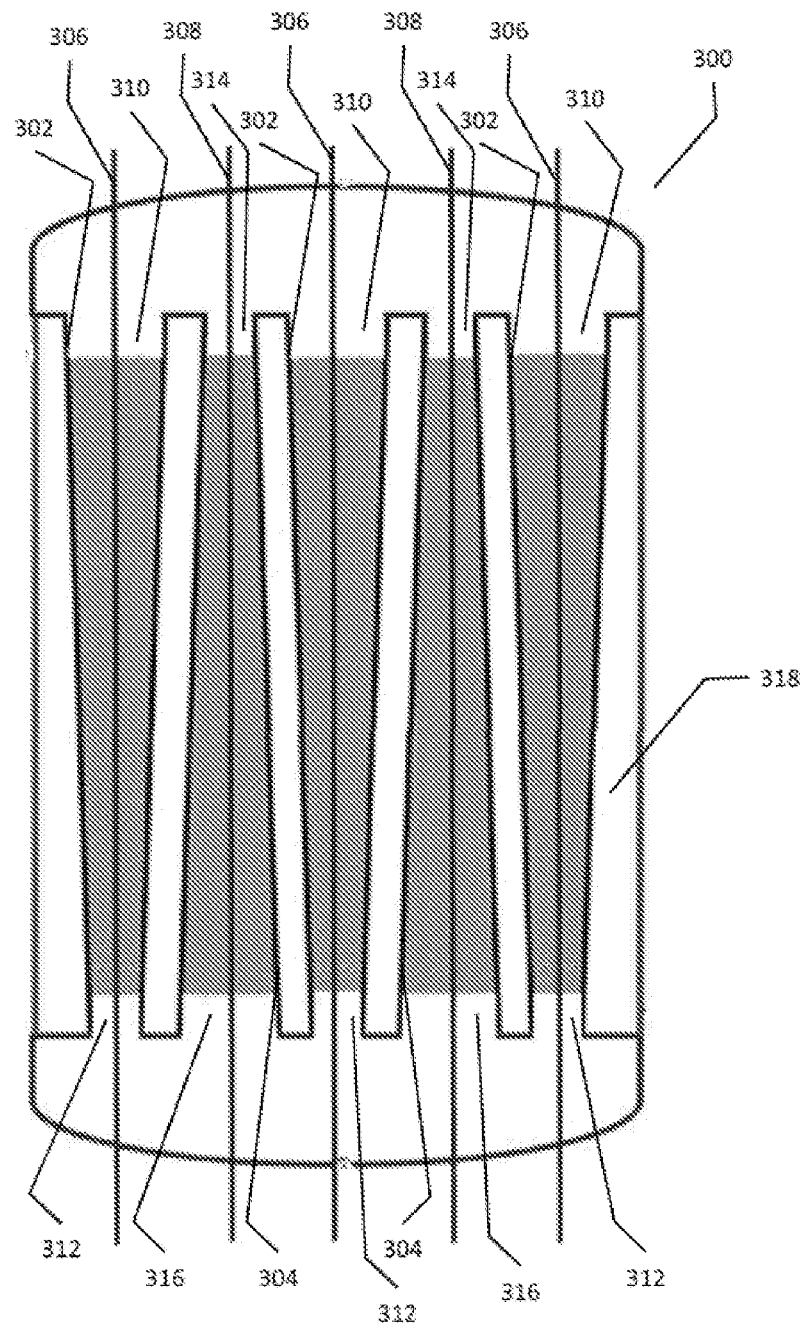
FIG. 3 shows a non-limiting view of a first catalyst holding zone, second catalyst holding zone, and one cooling section.

Now referring to FIG. 3, which shows a non-limiting exemplary aspect of the reactors disclosed herein. FIG. 3 shows a reactor (300) with first catalyst holding zone and with second catalyst holding zone as disclosed herein. The first catalyst holding zone of the reactor (300) have a first inner surface (302). The first catalyst holding zone also has a first longitudinal axis (306). The inner surface (302) is tapered toward the first longitudinal axis (206) from the first end (310) to the second end (312). The second catalyst holding zone of the reactor (300) have a second inner surface (304). The second catalyst holding zone has a second longitudinal axis (308). The inner surface (302) is tapered away from the second longitudinal axis (308) from the first end (314) to the second end (316) of the second catalyst holding zone. The reactor (300) can also have a cooling section (318).

3. Methods of Using a Reactor

The reactors disclosed herein can be used in methods to produce hydrocarbons.

Disclosed herein is a method of producing hydrocarbons comprising: a) providing a reactor disclosed herein; b) introducing syngas in the first mixing zone; c) catalytically reacting at least a portion of the syngas in the first reaction zone, thereby producing a first product comprising hydrocarbons, $H_2O$, and unreacted syngas; d) cooling the first product in the first cooling zone; e) removing at least a portion of the H₂O from the first product in the first H₂O separation zone; f) introducing the first product in the second mixing zone; g) catalytically reacting at least a portion of the unreacted syngas in the first product in the second reaction zone, thereby producing a second product comprising hydrocarbons, H₂O, and unreacted syngas; h) cooling the second product in the second cooling zone; and i) removing at least a portion of the H₂O from the second product in the second H₂O separation zone.

In one aspect, the method further comprises: j) introducing the second product in the third mixing zone; k) catalytically reacting at least a portion of the unreacted syngas in the second product in the third reaction zone, thereby producing a third product comprising hydrocarbons, H₂O, and unreacted syngas; l) cooling the third product in the third cooling zone; and m) removing at least a portion of the H₂O from the third product in the third H₂O separation zone.

In one aspect, the method further comprises: n) introducing the third product in the fourth mixing zone; o) catalytically reacting at least a portion of the unreacted syngas in the third product in the fourth reaction zone, thereby producing a fourth product comprising hydrocarbons, H₂O, and unreacted syngas; p) cooling the fourth product in the fourth cooling zone; and q) removing at least a portion of the H₂O from the fourth product in the fourth H₂O separation zone.

In one aspect, the method further comprises collecting a product, such as, for example, the first product, second product, third product, or fourth product.

It is appreciated that the methods described herein can comprise additional steps such as a fifth, sixth, seventh, eighth, ninth, tenth, eleventh, twelfth, thirteenth, fourteenth, fifteenth, sixteenth, seventeenth, eighteenth, nineteenth, and twentieth zone. It is understood that the zone, such as, for example, the fifth step would include an introduction, reaction, cooling and H₂O absorption step as described herein.

The introduction of the syngas in the first mixing zone can be continuous. The syngas introduced into the first mixing zone comprises H₂ and CO at molar ratios as disclosed herein. The catalytic reaction of the at least a portion of the syngas in the first reaction zone is carried out by a Fischer-Tropsch catalyst, such as, for example, Fe based catalysts and/or Co based catalysts and/or Ru based catalysts. This catalytic reaction is exothermic and generates heat. The first product produced by the catalytic reaction of the at least a portion of the syngas comprises hydrocarbons, H₂O, and unreacted syngas. The hydrocarbons in the first product comprise C2-C10 hydrocarbons, such as, C2-C6 hydrocarbons. The H₂O can be in liquid and/or gas form. The unreacted syngas comprises H₂ and CO at molar ratios as disclosed herein, the molar ratio of the H₂ and CO can be different in the first product as compared to syngas that was introduced into the first mixing zone. The first product is then transported to the first cooling zone that cools the first product. The temperature of the first product can be reduced by at least 5%, such as by at least 10%, 20%, or 40%. After cooling, the first product is transported from the cooling zone to the first H₂O separation zone. A portion of the H₂O in the first product is removed from the first product. At least 20% of the H₂O in the first product is removed, such as, for example, at least 30%, 40%, or 60% of the H₂O is removed. The first product is then introduced into the second mixing zone. A portion of the unreacted syngas in the first product can then be catalytically reacted in the second reaction zone. The Fischer-Tropsch catalyst in the second reaction zone can be the same or different than the Fischer-Tropsch catalyst in the first reaction zone. The catalytic reaction in the second reaction zone produces a second product comprising hydrocarbons, H₂O, and unreacted syngas. The hydrocarbons in the second product comprise C2-C10 hydrocarbons, such as, C2-C6 hydrocarbons. The H₂O in the second product can be in liquid and/or gas form. The unreacted syngas in the second product comprises H₂ and CO at molar ratios as disclosed herein, the molar ratio of the H₂ and CO in the second product can be different than the molar ratio of the H₂ and CO in the first product and the molar ratio of the H₂ and CO in the syngas that was introduced into the first mixing zone. The second product is then transported to the second cooling zone that cools product. The temperature of the second product can be reduced by at least 5%, such as by at least 10%, 20%, or 40%. After cooling, the second product is transported from the second cooling zone to the second H₂O separation zone. A portion of the H₂O in the second product is removed from the second product. At least 20% of the H₂O in the second product is removed, such as, for example, at least 30%, 40%, or 60% of the H₂O is removed.

The second product can then be introduced into the third mixing zone. A portion of the unreacted syngas in the second product can then be catalytically reacted in the third reaction zone. A portion of the unreacted syngas in the second product can then be catalytically reacted in the third reaction zone. The Fischer-Tropsch catalyst in the third reaction zone can be the same or different than the Fischer-Tropsch catalyst in the first reaction zone and/or second reaction zone. The catalytic reaction in the third reaction zone produces a third product comprising hydrocarbons, H₂O, and unreacted syngas. The hydrocarbons in the third product comprise C2-C10 hydrocarbons, such as, C2-C6 hydrocarbons. The H₂O in the third product can be in liquid and/or gas form. The unreacted syngas in the third product comprises H₂ and CO at molar ratios as disclosed herein, the molar ratio of the H₂ and CO in the third product can be different than the molar ratio of the H₂ and CO in the first product, the second product, and/or the molar ratio of the H₂ and CO in the syngas that was introduced into the first mixing zone. The third product is then transported to the third cooling zone that cools product. The temperature of the third product can be reduced by at least 5%, such as by at least 10%, 20%, or 40%. After cooling, the third product is transported from the third cooling zone to the third H₂O separation zone. A portion of the H₂O in the third product is removed from the third product. At least 20% of the H₂O in the third product is removed, such as, for example, at least 30%, 40%, or 60% of the H₂O is removed.

The third product can then be introduced into the fourth mixing zone. A portion of the unreacted syngas in the third product can then be catalytically reacted in the fourth reaction zone. A portion of the unreacted syngas in the third product can then be catalytically reacted in the fourth reaction zone. The Fischer-Tropsch catalyst in the fourth reaction zone can be the same or different than the Fischer-Tropsch catalyst in the first reaction zone, second reaction zone, and/or third reaction zone. The catalytic reaction in the fourth reaction zone produces a fourth product comprising hydrocarbons, H₂O, and unreacted syngas. The hydrocarbons in the fourth product comprise C2-C10 hydrocarbons, such as, C2-C6 hydrocarbons. The H₂O in the third product can be in liquid and/or gas form. The unreacted syngas in the fourth product comprises H₂ and CO at molar ratios as disclosed herein, the molar ratio of the H₂ and CO in the third product can be different than the molar ratio of the H₂ and CO in the first product, the second product, the third product, and/or the molar ratio of the H₂ and CO in the syngas that was introduced into the first mixing zone. The fourth product is then transported to the fourth cooling zone that cools product. The temperature of the fourth product can be reduced by at least 5%, such as by at least 10%, 20%, or 40%. After cooling, the fourth product is transported from the third cooling zone to the third $H_2O$ separation zone. A portion of the $H_2O$ in the fourth product is removed from the fourth product. At least 20% of the $H_2O$ in the fourth product is removed, such as, for example, at least 30%, 40%, or 60% of the $H_2O$ is removed.

In one aspect, at least 10%, such as for example, at least 20%, 30%, 40% or 50%, of the syngas introduced into the first mixing zone is converted to hydrocarbons.

In one aspect, at least 10%, such as for example, at least 20%, 30%, 40% or 50%, of the unreacted syngas introduced into the second mixing zone is converted to hydrocarbons.

In one aspect, at least 10%, such as for example, at least 20%, 30%, 40% or 50%, of the unreacted syngas introduced into the third mixing zone is converted to hydrocarbons.

In one aspect, at least 10%, such as for example, at least 20%, 30%, 40% or 50%, of the unreacted syngas introduced into the fourth mixing zone is converted to hydrocarbons.

In one aspect, at least 50%, 60%, 70%, or 80% of the syngas introduced into the first mixing zone is converted into hydrocarbons after step o).

In one aspect, at least 20%, of the $H_2O$ is removed from the first product, such as, for example, at least 30%, 40%, or 60% of the $H_2O$ is removed.

In one aspect, at least 20% of the $H_2O$ is removed from the second product, such as, for example, at least 30%, 40%, or 60% of the $H_2O$ is removed.

In one aspect, at least 20% of the $H_2O$ is removed from the third product, such as, for example, at least 30%, 40%, or 60% of the $H_2O$ is removed.

In one aspect, at least 20% of the $H_2O$ is removed from the fourth product, such as, for example, at least 30%, 40%, or 60% of the $H_2O$ is removed.

The removal of $H_2O$ in each reaction cycle minimizes the production of isomers and extends the catalyst lifetime.

4. Aspects

In view of the described catalyst and catalyst compositions and methods and variations thereof, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A reactor comprising: a) a first mixing zone, b) a first reaction zone, c) a first cooling zone, d) a first $H_2O$ separation zone, e) a second mixing zone, f) a second reaction zone, g) a second cooling zone, h) a second $H_2O$ separation zone, wherein the first mixing zone is in fluid communication with the first reaction zone, wherein the first reaction zone is in fluid communication with the first cooling zone, wherein the first cooling zone is in fluid communication with the first $H_2O$ separation zone, wherein the first $H_2O$ separation zone is in fluid communication with the second mixing zone, wherein the second mixing zone is in fluid communication with the second reaction zone, wherein the second reaction zone is in fluid communication with the second cooling zone, and wherein the second cooling zone is in fluid communication with the second $H_2O$ separation zone.

Aspect 2: The reactor of aspect 1, wherein the reactor further comprises: i) a third mixing zone, j) a third reaction zone, k) a third cooling zone, l) a third $H_2O$ separation zone, wherein the second $H_2O$ separation zone is in fluid communication with the third mixing zone, wherein the third mixing zone is in fluid communication with the third reaction zone, wherein the third reaction zone is in fluid communication with the third cooling zone, and wherein the third cooling zone is in fluid communication with the third $H_2O$ separation zone.

Aspect 3: The reactor of aspect 2, wherein the reactor further comprises: m) a fourth mixing zone, n) a fourth reaction zone, o) a fourth cooling zone, p) a fourth $H_2O$ separation zone, wherein the third $H_2O$ separation zone is in fluid communication with the fourth mixing zone, wherein the fourth mixing zone is in fluid communication with the fourth reaction zone, wherein the fourth reaction zone is in fluid communication with the fourth cooling zone, and wherein the fourth cooling zone is in fluid communication with the fourth $H_2O$ separation zone.

Aspect 4: The reactor of any one of aspects 1-3, wherein the first mixing zone and the second reaction zone are configured to allow mixing of gases.

Aspect 5: The reactor of aspects 2 or 3, wherein the third mixing zone is configured to allow mixing of gases.

Aspect 6: The reactor of aspect 3, wherein the fourth mixing zone is configured to allow mixing of gases.

Aspect 7: The reactor of any one of aspect 1-6, wherein the first reaction zone and the second reaction zone comprise a catalyst.

Aspect 8: The reactor of aspect 7, wherein the amount of catalyst in the second reaction zone is less than the amount of catalyst in the first reaction zone.

Aspect 9: The reactor of any one of aspects 2-8, wherein the third reaction zone comprises a catalyst.

Aspect 10: The reactor of aspect 9, wherein the amount of catalyst in the third reaction zone is less than the amount of catalyst in the second reaction zone.

Aspect 11: The reactor of any one of aspects 3-9, wherein the fourth reaction zone comprises a catalyst.

Aspect 12: The reactor of aspect 11, wherein the amount of catalyst in the third reaction zone is less than the amount of catalyst in the fourth reaction zone.

Aspect 13: The reactor of any one of aspects 1-12, wherein the first cooling zone and the second cooling zone comprise an intercooler system.

Aspect 14: The reactor of any one of aspects 2-13, wherein the third cooling zone comprises an intercooler system.

Aspect 15: The reactor of any one of aspects 3-14, wherein the fourth cooling zone comprises an intercooler system.

Aspect 16: The reactor of any one of aspects 1-15, wherein the first $H_2O$ separation zone and the second $H_2O$ separation zone comprise an $H_2O$ absorbent material.

Aspect 17: The reactor of any one of aspects 2-16, wherein the third $H_2O$ separation zone comprises an $H_2O$ absorbent material.

Aspect 18: The reactor of any one of aspects 3-17, wherein the fourth $H_2O$ separation zone comprises an $H_2O$ absorbent material.

Aspect 19: The reactor of any one of aspects 1-18, wherein the first cooling zone is in fluid communication with the first $H_2O$ separation zone via a first connector.

Aspect 20: The reactor of any one of aspects 1-19, wherein the first $H_2O$ separation zone is in fluid communication with the second mixing zone via a second connector.

Aspect 21: The reactor of any one of aspects 1-20, wherein the second cooling zone is in fluid communication with the second $H_2O$ separation zone via a third connector.

Aspect 22: The reactor of any one of aspects 2-21, wherein the second $H_2O$ separation zone is in fluid communication with the third mixing zone via a fourth connector.

Aspect 23: The reactor of any one of aspects 2-22, wherein the third cooling zone is in fluid communication with the third $H_2O$ separation zone via a fifth connector.

Aspect 24: The reactor of any one of aspects 3-23, wherein the third $H_2O$ separation zone is in fluid communication with the fourth mixing zone via a sixth connector.

Aspect 25: The reactor of any one of aspects 3-24, wherein the fourth cooling zone is in fluid communication with the fourth $H_2O$ separation zone via a seventh connector.

Aspect 26: A method of producing hydrocarbons comprising: a) providing the reactor of any one of aspects 1-25; b) introducing syngas in the first mixing zone; c) catalytically reacting at least a portion of the syngas in the first reaction zone, thereby producing a first product comprising hydrocarbons, $H_2O$, and unreacted syngas; d) cooling the first product in the first cooling zone; e) removing at least a portion of the $H_2O$ from the first product in the first $H_2O$ separation zone; f) introducing the first product in the second mixing zone; g) catalytically reacting at least a portion of the unreacted syngas in the first product in the second reaction zone, thereby producing a second product comprising hydrocarbons, $H_2O$, and unreacted syngas; h) cooling the second product in the second cooling zone; and i) removing at least a portion of the $H_2O$ from the second product in the second $H_2O$ separation zone.

Aspect 27: The method of aspect 26, wherein method further comprises: j) introducing the second product in the third mixing zone; k) catalytically reacting at least a portion of the unreacted syngas in the second product in the third reaction zone, thereby producing a third product comprising hydrocarbons, $H_2O$, and unreacted syngas; l) cooling the third product in the third cooling zone; and m) removing at least a portion of the $H_2O$ from the third product in the third $H_2O$ separation zone.

Aspect 28: The method of aspect 27, wherein method further comprises: n) introducing the third product in the fourth mixing zone; o) catalytically reacting at least a portion of the unreacted syngas in the third product in the fourth reaction zone, thereby producing a fourth product comprising hydrocarbons, $H_2O$, and unreacted syngas; p) cooling the fourth product in the fourth cooling zone; and q) removing at least a portion of the $H_2O$ from the fourth product in the fourth $H_2O$ separation zone.

Aspect 29: The method of any one of aspects 26-28, wherein at least 10% of the syngas introduced into the first mixing zone is converted to hydrocarbons.

Aspect 30: The method of any one of aspects 26-28, wherein at least 10% of the unreacted syngas introduced into the second mixing zone is converted to hydrocarbons.

Aspect 31: The method of any one of aspects 27-28, wherein at least 10% of the unreacted syngas introduced into the third mixing zone is converted to hydrocarbons.

Aspect 32: The method of aspect 28, wherein at least 10% of the unreacted syngas introduced into the fourth mixing zone is converted to hydrocarbons.

Aspect 33: The method of aspect 28, wherein at least 10% of the syngas introduced into the first mixing zone is converted into hydrocarbons after step o).

Aspect 34: The method of any one of aspects 26-33, wherein at least 20% of the $H_2O$ is removed from the first product.

Aspect 35: The method of any one of aspects 26-34, wherein at least 20% of the $H_2O$ is removed from the second product.

Aspect 36: The method of any one of aspects 27-35, wherein at least 20% of the $H_2O$ is removed from the third product.

Aspect 37: The method of any one of aspects 28-36, wherein at least 20% of the $H_2O$ is removed from the fourth product.

What is claimed is:

1. A reactor comprising:
a) a first mixing zone;
b) a first reaction zone;
c) a first cooling zone;
d) a first $H_2O$ separation zone;
e) a second mixing zone;
a second reaction zone;
g) a second cooling zone; and
h) a second $H_2O$ separation zone,
wherein the first mixing zone is in fluid communication with the first reaction zone, wherein the first reaction zone is in fluid communication with the first cooling zone, wherein the first cooling zone is in fluid communication with the first $H_2O$ separation zone, wherein the first $H_2O$ separation zone is in fluid communication with the second mixing zone, wherein the second mixing zone is in fluid communication with the second reaction zone, wherein the second reaction zone is in fluid communication with the second cooling zone, and wherein the second cooling zone is in fluid communication with the second $H_2O$ separation zone,
wherein the first mixing zone, the first reaction zone, the first cooling zone, the second mixing zone, the second reaction zone, and the second cooling zone all have a common longitudinal axis,
wherein the first $H_2O$ separation zone and the second $H_2O$ separation zone do not have a common longitudinal axis with the first mixing zone, the first reaction zone, the first cooling zone, the second mixing zone, the second reaction zone, and the second cooling zone,
wherein a divider is present between the first cooling zone and the second mixing zone to physically separate the first cooling zone from the second mixing zone.

2. The reactor of claim 1, wherein the reactor further comprises:
i) a third mixing zone
j) a third reaction zone;
k) a third cooling zone; and
l) a third $H_2O$ separation zone,
wherein the second $H_2O$ separation zone is in fluid communication with the third mixing zone, wherein the third mixing zone is in fluid communication with the third reaction zone, wherein the third reaction zone is in fluid communication with the third cooling zone, and wherein the third cooling zone is in fluid communication with the third $H_2O$ separation zone,
wherein the first mixing zone, the first reaction zone, the first cooling zone, the second mixing zone, the second reaction zone, and the second cooling zone, the third mixing zone, the third reaction zone, and the third cooling zone all have a common longitudinal axis, wherein the first H₂O separation zone, the second H₂O separation zone, and the third H₂O separation zone do not have a common longitudinal axis with the first reaction zone, the first cooling zone, the second mixing zone, the second reaction zone, and the second cooling zone, the third mixing zone, the third reaction zone, and the third cooling zone, wherein a divider is present between the second cooling zone and the third mixing zone to physically separate the second cooling zone from the third mixing zone.

3. The reactor of claim 2, wherein the reactor further comprises:
   m) a fourth mixing zone;
   n) a fourth reaction zone;
   o) a fourth cooling zone; and
   p) a fourth H₂O separation zone,
   wherein the third H₂O separation zone is in fluid communication with the fourth mixing zone, wherein the fourth mixing zone is in fluid communication with the fourth reaction zone, wherein the fourth reaction zone is in fluid communication with the fourth cooling zone, and wherein the fourth cooling zone is in fluid communication with the fourth H₂O separation zone,
   wherein the first mixing zone, the first reaction zone, the first cooling zone, the second mixing zone, the second reaction zone, and the second cooling zone, the third mixing zone, the third reaction zone, and the third cooling zone, the fourth mixing zone, the fourth reaction zone, and the fourth cooling zone all have a common longitudinal axis,
   wherein the first H₂O separation zone, the second H₂O separation zone, the third H₂O separation zone, and the fourth H₂O separation zone do not have a common longitudinal axis with the first reaction zone, the first cooling zone, the second mixing zone, the second reaction zone, and the second cooling zone, the third mixing zone, the third reaction zone, the third cooling zone, the fourth mixing zone, the fourth reaction zone, and the fourth cooling zone,
   wherein a divider is present between the third cooling zone and the fourth mixing zone to physically separate the third cooling zone from the fourth mixing zone.

4. The reactor of claim 1, wherein the first reaction zone and the second reaction zone comprise a catalyst.

5. The reactor of claim 4, wherein the amount of catalyst in the second reaction zone is less than the amount of catalyst in the first reaction zone.

6. The reactor of claim 2, wherein the third reaction zone comprises a catalyst.

7. The reactor of claim 6, wherein the amount of catalyst in the third reaction zone is less than the amount of catalyst in the second reaction zone.

8. The reactor of claim 3, wherein the fourth reaction zone comprises a catalyst.

9. The reactor of claim 8, wherein the amount of catalyst in the fourth reaction zone is less than the amount of catalyst in the third reaction zone.

10. The reactor of claim 1, wherein the first cooling zone is in fluid communication with the first H₂O separation zone via a first connector.

11. The reactor of claim 1, wherein the first H₂O separation zone is in fluid communication with the second mixing zone via a second connector.

12. The reactor of claim 1, wherein the second cooling zone is in fluid communication with the second H₂O separation zone via a third connector.

13. The reactor of claim 2, wherein the second H₂O separation zone is in fluid communication with the third mixing zone via a fourth connector.

14. The reactor of claim 2, wherein the third cooling zone is in fluid communication with the third H₂O separation zone via a fifth connector.

15. The reactor of claim 3, wherein the third H₂O separation zone is in fluid communication with the fourth mixing zone via a sixth connector.

16. The reactor of claim 3, wherein the fourth cooling zone is in fluid communication with the fourth H₂O separation zone via a seventh connector.

17. A method of producing hydrocarbons comprising:
   a) providing the reactor of claim 1;
   b) introducing syngas in the first mixing zone;
   c) catalytically reacting at least a portion of the syngas in the first reaction zone, thereby producing a first product comprising hydrocarbons, H₂O, and unreacted syngas;
   d) cooling the first product in the first cooling zone;
   e) removing at least a portion of the H₂O from the first product in the first H₂O separation zone;
   f) introducing the first product in the second mixing zone;
   g) catalytically reacting at least a portion of the unreacted syngas in the first product in the second reaction zone, thereby producing a second product comprising hydrocarbons, H₂O, and unreacted syngas;
   h) cooling the second product in the second cooling zone; and
   i) removing at least a portion of the H₂O from the second product in the second H₂O separation zone.

18. The method of claim 17, wherein method further comprises:
   j) introducing the second product in the third mixing zone;
   k) catalytically reacting at least a portion of the unreacted syngas in the second product in the third reaction zone, thereby producing a third product comprising hydrocarbons, H₂O, and unreacted syngas;
   l) cooling the third product in the third cooling zone; and
   m) removing at least a portion of the H₂O from the third product in the third H₂O separation zone.

19. The method of claim 18, wherein method further comprises:
   n) introducing the third product in the fourth mixing zone;
   o) catalytically reacting at least a portion of the unreacted syngas in the third product in the fourth reaction zone, thereby producing a fourth product comprising hydrocarbons, H₂O, and unreacted syngas;
   p) cooling the fourth product in the fourth cooling zone; and
   q) removing at least a portion of the H₂O from the fourth product in the fourth H₂O separation zone.

20. The method of claim 17, wherein at least 10% of the syngas introduced into the first mixing zone is converted to hydrocarbons.

* * * * *